United States Patent
Baldet

(10) Patent No.: US 7,549,649 B2
(45) Date of Patent: Jun. 23, 2009

(54) VEHICLE WITH A VEHICLE DYNAMIC PERFORMANCE SELECTION SWITCH ON THE STEERING WHEEL

(75) Inventor: Franck Baldet, Torre Maina (IT)

(73) Assignee: Ferrari S.p.A., Modena (IT)

( * ) Notice: Subject to any disclaimer, the term of this patent is extended or adjusted under 35 U.S.C. 154(b) by 271 days.

(21) Appl. No.: 10/552,042

(22) PCT Filed: Apr. 2, 2004

(86) PCT No.: PCT/EP2004/050433

§ 371 (c)(1),
(2), (4) Date: Sep. 19, 2006

(87) PCT Pub. No.: WO2004/087484

PCT Pub. Date: Nov. 14, 2004

(65) Prior Publication Data

US 2007/0163376 A1    Jul. 19, 2007

(30) Foreign Application Priority Data

Apr. 4, 2003    (IT)    .......................... BO2003A0198

(51) Int. Cl.
*B60G 17/0165*    (2006.01)

(52) U.S. Cl. ............... 280/5.519; 74/473.31; 180/333; 701/54

(58) Field of Classification Search .................. 280/5.5, 280/5.515, 5.519; 74/484 R, 473.31, 473.3; 200/61.54; 180/333, 197; 701/51–54
See application file for complete search history.

(56) References Cited

U.S. PATENT DOCUMENTS

| 4,884,651 A | 12/1989 | Harada et al. |
| 6,044,318 A | 3/2000 | Bourdon et al. |
| 6,349,616 B1 * | 2/2002 | Onodera et al. ............... 74/552 |
| 6,360,149 B1 | 3/2002 | Kwon et al. |
| 6,941,209 B2 * | 9/2005 | Liu .............................. 701/54 |
| 2003/0023353 A1 | 1/2003 | Badarneh |

FOREIGN PATENT DOCUMENTS

| DE | 39 41 665 A | 6/1991 |
| DE | 197 47 269 A | 4/1999 |
| EP | 1 078 831 A2 | 2/2001 |

* cited by examiner

*Primary Examiner*—Ruth Ilan
*Assistant Examiner*—Drew J. Brown
(74) *Attorney, Agent, or Firm*—Birch, Stewart, Kolasch & Birch, LLP

(57) ABSTRACT

A vehicle (1) having a central control unit (13) which supervises operation of active components of the vehicle (1), and modifies the operating parameters of the active components to modify the dynamic performance of the vehicle (1); and a selection device (15) which is located inside the passenger compartment (11) of the vehicle (1), and is operated by the driver to transmit a selected dynamic performance of the vehicle (1) to the central control unit (13); the selection device (15) includes a switch (16) fitted to the steering wheel (12) of the vehicle (1) and rotatable between at least four different positions (A, B, C, D), each corresponding to a respective dynamic performance of the vehicle (1).

16 Claims, 2 Drawing Sheets

VEHICLE WITH A VEHICLE DYNAMIC PERFORMANCE SELECTION SWITCH ON THE STEERING WHEEL

TECHNICAL FIELD

The present invention relates to a vehicle enabling the driver to select the dynamic performance of the vehicle from a number of predetermined programs.

BACKGROUND ART

As is known, the high power and fast response of high-performance road sports cars make them fairly difficult to drive, especially in unfavourable weather. To make normal driving safer, high-performance sports cars are therefore equipped with various electronic driver-aid devices, such as an ABS (Anti Block System, for preventing the wheels blocking when braking), ESP (Electronic Stability Program, for controlling vehicle stability), ASP (Anti Skid Program, for preventing skid of the drive wheels), and electronic suspension control (for adjusting suspension response to stress).

To enable the driver to adapt response of the electronic driver-aid devices to the desired driving mode and weather conditions, the passenger compartment of the vehicle is normally equipped, on the central tunnel close to the gear lever, with a selection button for transmitting the driver-selected driving mode—normal or sport—to a central control unit.

The gradual increase in the number and complexity of electronic driver-aid devices calls for increased communication between the driver and the central control unit, to enable the central control unit to control the electronic driver-aid devices as best suited to both driving mode and weather conditions. Accordingly, it has been proposed to equip the central tunnel with a series of buttons enabling the driver to choose between various dynamic vehicle performance modes.

Tests have shown, however, that the above solution, featuring a number of buttons on the central tunnel, is complicated to use and tends to distract the driver when driving the vehicle.

DISCLOSURE OF INVENTION

It is an object of the present invention to provide a vehicle which is cheap and easy to produce, and which, at the same time, provides for eliminating the aforementioned drawbacks.

According to the present invention, there is provided a vehicle as claimed in the attached Claims.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
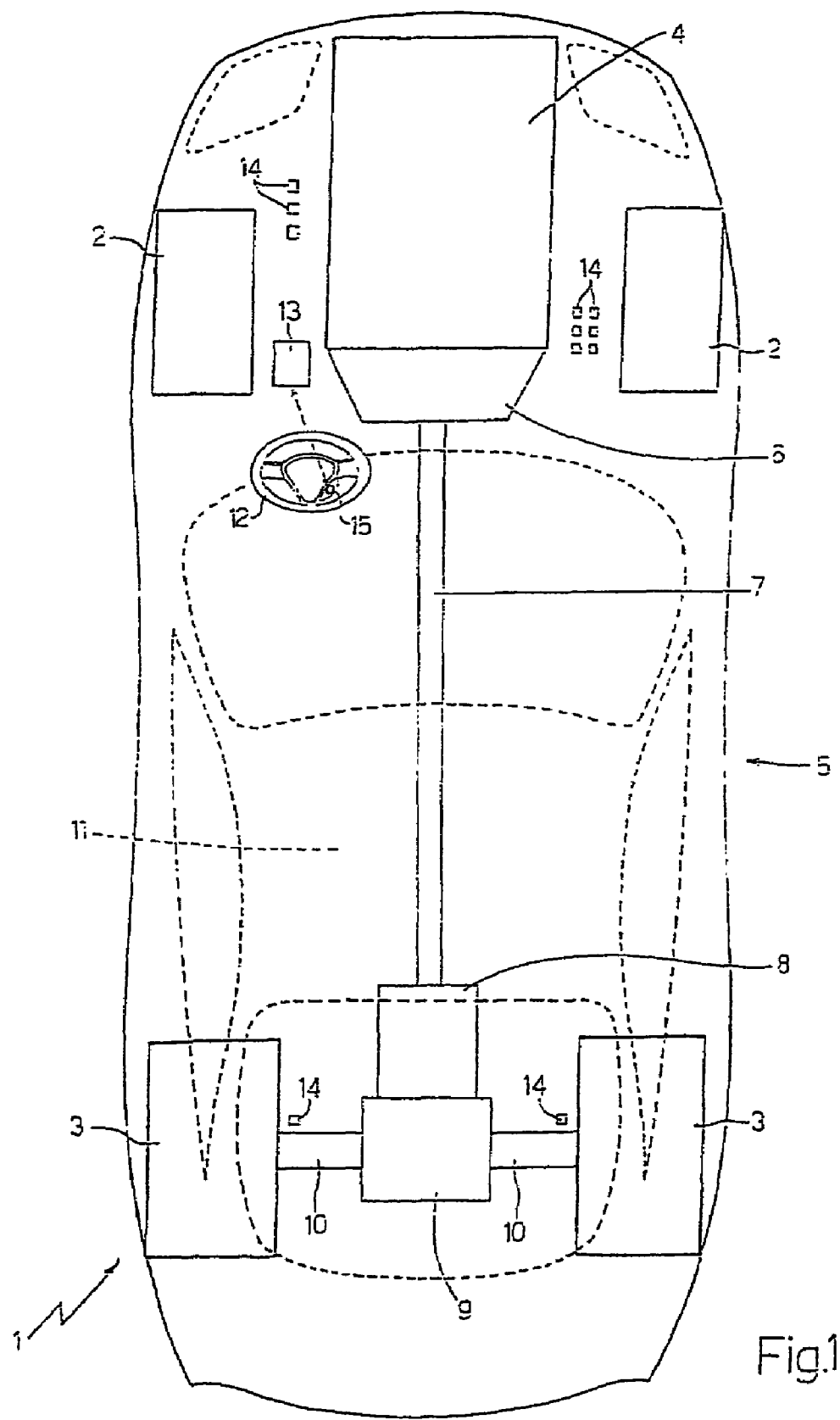
FIG. 1 shows a schematic plan view of a rear-drive vehicle in accordance with the present invention.

Number 1 in FIG. 1 indicates a vehicle having two front wheels 2 and two rear drive wheels 3, and comprising a front internal combustion engine 4 producing a drive torque which is transmitted to rear drive wheels 3 by a power train 5. Power train 5 comprises a clutch 6 housed in a casing integral with engine 4 and for connecting the drive shaft of engine 4 to a propeller shaft 7 terminating in a mechanical power gearbox 8 at the rear; and a self-locking differential 9, with electronic lock percentage control, is cascade-connected to gearbox 8, and from which extend two axle shafts 10, each integral with a respective rear drive wheel 3. Vehicle 1 also comprises a known electronically controlled braking system (not shown in detail) acting on wheels 2 and 3; and a known suspension system (not shown in detail) with electronically controlled suspension response. Vehicle 1 also comprises a passenger compartment 11 equipped with a steering wheel 12 for imparting a turning angle to front wheels 2.

Vehicle 1 comprises a central control unit 13 for supervising operation of the active components of vehicle 1, and connected to a number of sensors 14 distributed inside vehicle 1 to real-time detect respective parameters of vehicle 1, such as the travelling speed of vehicle 1, the turning angle of vehicle 1, the yaw speed of vehicle 1, the lateral acceleration of vehicle 1, the longitudinal acceleration of vehicle 1, the rotation speed of each wheel 2 or 3, and the drive torque generated by engine 4. Central control unit 13 may obviously be defined by a number of physically separate processing units connected to one another, for example, by a data BUS; and, as opposed to a physical sensor 14, an estimation algorithm may be implemented by central control unit 13 to determine one or more parameters of vehicle 1.

Internally, central control unit 13 implements the functions of various electronic driver-aid devices, and in particular prevents blocking of wheels 2 and 3 when braking (so-called ABS function), prevents skidding of rear drive wheels 3 (so-called ASP function), controls the stability of vehicle 1 (so-called ESP function), and provides for electronically controlling suspension response, servocontrol of gearbox 8, and the lock percentage of self-locking differential 9. Central control unit 13 also modifies the operating parameters of the active components of vehicle 1 (typically engine 4 and the above electronic driver-aid devices) to modify dynamic performance of vehicle 1. To enable the driver to choose the dynamic performance of vehicle 1, a selection device 15 is provided inside passenger compartment 11 of vehicle 1, and is operated by the driver to transmit the selected dynamic performance of vehicle 1 to central control unit 13.

Figure 2:
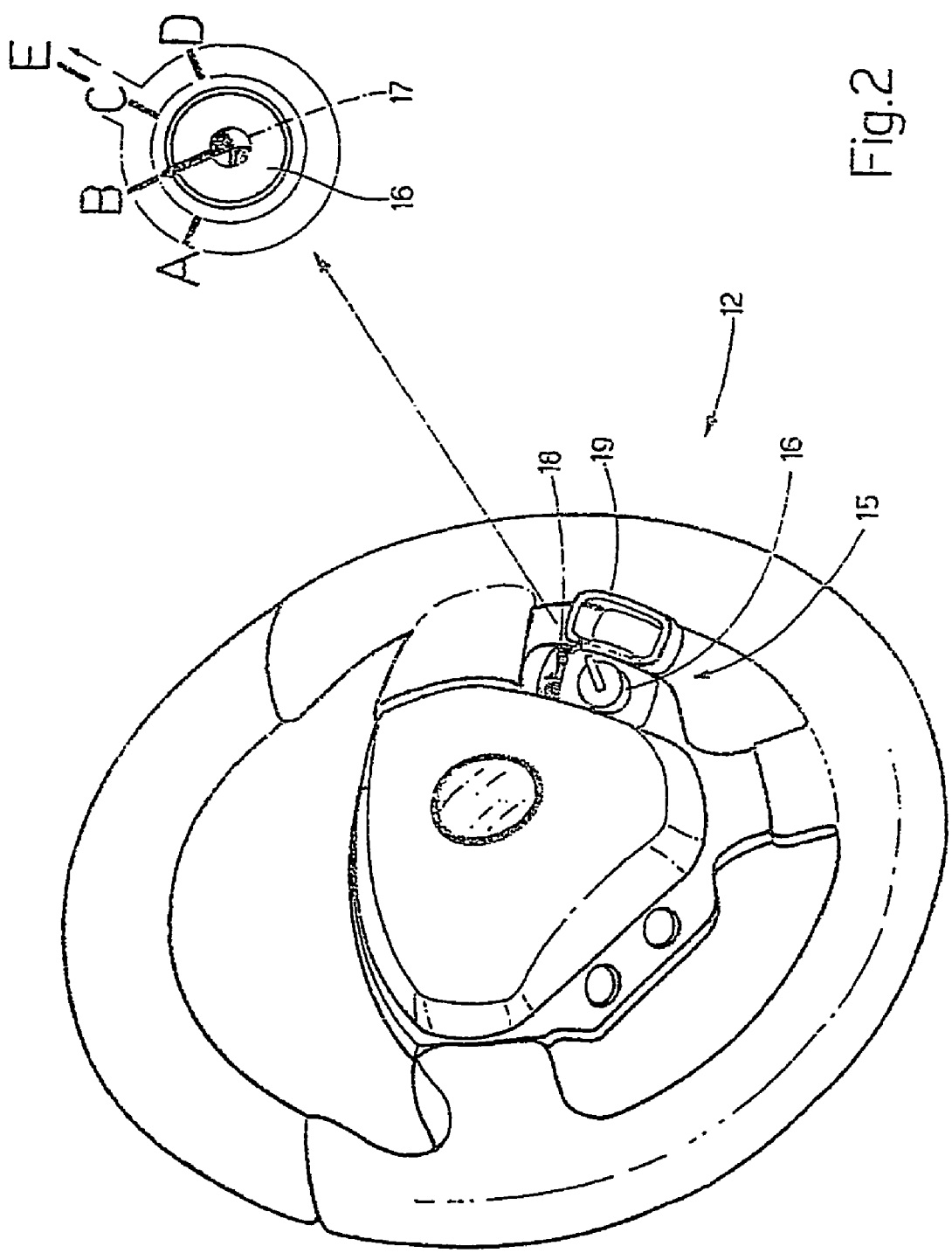
FIG. 2 shows a larger-scale front view of the steering wheel of the FIG. 1 vehicle.

As shown in FIG. 2, selection device 15 comprises a switch 16 fitted to steering wheel 12 and which is rotated about a respective axis 17 between four positions (indicated A-D for simplicity), each corresponding to a respective dynamic performance of vehicle 1. Steering wheel 12 has a recessed seat 18 housing switch 16, and a cover 19 hinged to steering wheel 12 and for closing seat 18.

When switch 16 is set to position A (so-called "ICE" position), central control unit 13 sets the dynamic performance of vehicle 1 to drive on low-grip road surfaces. More specifically, in position A, the performance of engine 4, servocontrol of gearbox 8, and electronic control of the lock percentage of self-locking differential 9 are set for low-grip operation, and electronic suspension response control and electronic control of the stability of vehicle 1 are set for normal operation.

When switch 16 is set to position B (so-called "SPORT WET" position), central control unit 13 sets the dynamic performance of vehicle 1 to drive on low-grip road surfaces in sport mode. More specifically, in position B, the performance of engine 4, electronic suspension response control, and electronic control of the lock percentage of differential 9 are set for normal operation, and servocontrol of gearbox 8 and electronic control of the stability of vehicle 1 are set for sport operation.

When switch 16 is set to position C (so-called "SPORT DRY" position), central control unit 13 sets the dynamic performance of vehicle 1 to drive on firm-grip road surfaces in sport mode. More specifically, in position C, the performance of engine 4, electronic suspension response control, electronic lock percentage control, servocontrol of gearbox 8, and electronic control of the stability of vehicle 1 are set for sport operation.

When switch 16 is set to position D (so-called "NORMAL" position), central control unit 13 sets the dynamic performance of vehicle 1 to drive in safe conditions in touring mode. More specifically, in position D, the performance of engine 4, electronic suspension response control, electronic lock percentage control, servocontrol of gearbox 8, and electronic control of the stability of vehicle 1 are set for normal operation.

Switch 16 may also be set to a position E, in which the dynamic performance of vehicle 1 is set to track racing mode. When switch 16 is set to position E (so-called "RACE" position), some of the electronic driver-aid devices (typically ESP, ABS and ASR) are preferably disabled to permit full driver control of vehicle 1. Switch 16 can only be set to position E from position C, by moving it linearly, in a direction crosswise to the axis 17 of rotation of switch 16, into a control position, from which switch 16 returns automatically to position C, normally by means of an elastic element (not shown in detail). The dynamic performance of vehicle 1 is set according to the angular position of switch 16, once engine 4 of vehicle 1 is turned off. This is indispensable for ensuring the driver does not inadvertently leave switch 16 in position E, and therefore some of the electronic driver-aid devices disabled, and for ensuring track racing dynamic performance of vehicle 1 is not maintained whenever engine 4 is started up again.

In an alternative embodiment, switch 16 is mounted to slide along its axis 17 in opposition to a further elastic element (not shown in detail), and is pressed by the driver to command performance by central control unit 13 of a racing-start procedure, if vehicle 1 is stationary when switch 16 is pressed. The racing-start procedure is used to pull away with the maximum possible acceleration compatible with the selected dynamic performance of vehicle 1. More specifically, the racing-start procedure is only performed if switch 16 is in position B or C when pressed; or switch 16 can only be pressed when in position B or C.

Road tests have shown selection device 15 as described above to be highly ergonomic, and easy to operate by both skilled and occasional drivers.

The invention claimed is:

1. A vehicle comprising
a passenger compartment having a steering wheel operated by the driver to steer the vehicle;
a central control unit which supervises operation of active components of the vehicle, and modifies the operating parameters of the active components to modify the dynamic performance of the vehicle; and
a selection device which is located inside the passenger compartment of the vehicle, is operated by the driver to transmit a selected dynamic performance of the vehicle to the central control unit, and comprises a switch fitted to the steering wheel of the vehicle and rotatable between at least four different positions, each corresponding to a respective dynamic performance of the vehicle;
wherein the switch can be rotated into a first position wherein the dynamic performance of the vehicle is set to drive on low-grip road surfaces, a second position wherein the dynamic performance of the vehicle is set to drive on low-grip road surfaces in sport driving mode, a third position wherein the dynamic performance of the vehicle is set to drive on firm-grip road surfaces in sport driving mode, and a fourth position wherein the dynamic performance of the vehicle is set to drive in safe conditions in touring driving mode; and
wherein the switch can be set to a fifth position wherein the dynamic performance of the vehicle is set to track racing mode which disables the electronic driver-aid devices.

2. A vehicle as claimed in claim 1, and comprising electronic driver-aid devices which are disabled when the switch is set to the fifth position.

3. A vehicle as claimed in claim 1, wherein the switch can only be set to the fifth position from the third position by moving the switch linearly into a control position, from which the switch returns automatically into the third position; the dynamic performance of the vehicle being set according to the angular position of the switch once the engine of the vehicle is turned off.

4. A vehicle as claimed in claim 1, wherein, to modify the dynamic performance of the vehicle, the central control unit acts on a servocontrol of a gearbox, on an electronic control controlling the lock percentage of a self-locking differential, on an electronic control controlling suspension response, on an electronic control controlling the stability of the vehicle, and on an electronic control controlling drive and response of the engine.

5. A vehicle as claimed in claim 4, wherein, in the first position, the performance of the engine, the servocontrol of the gearbox, and the electronic control controlling the lock percentage of the self-locking differential are set for low-grip operation, while the electronic control controlling suspension response, and the electronic control controlling the stability of the vehicle are set for normal operation; in the second position, the performance of the engine, the electronic control controlling suspension response, and the electronic control controlling the lock percentage of the differential are set for normal operation, while the servocontrol of the gearbox, and the electronic control controlling the stability of the vehicle are set for sport operation; in the third position, the performance of the engine, the electronic control controlling suspension response, the electronic control controlling the lock percentage, the servocontrol of the gearbox, and the electronic control controlling the stability of the vehicle are set for sport operation; and, in the fourth position, the performance of the engine, the electronic control controlling suspension response, the electronic control controlling the lock percentage, the servocontrol of the gearbox, and the electronic control controlling the stability of the vehicle are set for normal operation.

6. A vehicle as claimed in claim 1, wherein the steering wheel has a recessed seat housing the switch.

7. A vehicle as claimed in claim 6, wherein a cover is provided, and is hinged to the steering wheel to close the seat of the switch.

8. A vehicle as claimed in claim 1, wherein the switch is mounted to slide axially in opposition to elastic means, and is pressed by a user to command performance by the central control unit of a racing-start procedure, if the vehicle is stationary when the switch is pressed.

9. A vehicle as claimed in claim 8, wherein the switch may be rotated into a first position wherein the dynamic performance of the vehicle is set to drive on low-grip road surfaces, a second position wherein the dynamic performance of the vehicle is set to drive on low-grip road surfaces in sport driving mode, a third position wherein the dynamic performance of the vehicle is set to drive on normal-grip road surfaces in sport driving mode, and a fourth position wherein the dynamic performance of the vehicle is set to drive in safe conditions in touring driving mode; the racing-start procedure only being performed if, when the switch is pressed, the switch is in the second or third position.

10. A vehicle comprising
a passenger compartment having a steering wheel operated by the driver to steer the vehicle;
a central control unit which supervises operation of active components of the vehicle, and modifies the operating parameters of the active components to modify the dynamic performance of the vehicle; and
a selection device which is located inside the passenger compartment of the vehicle, and is operated by the driver to transmit a selected dynamic performance of the vehicle to the central control unit, and comprises a switch fitted to the steering wheel of the vehicle and rotatable between at least four different positions, each corresponding to a respective dynamic performance of the vehicle;
wherein the switch is mounted to slide axially in opposition to elastic means, and is pressed by a user to command performance by the central control unit of a racing-start procedure, if the vehicle is stationary when the switch is pressed.

11. A vehicle as claimed in claim 10, wherein the switch may be rotated into a first position wherein the dynamic performance of the vehicle is set to drive on low-grip road surfaces, a second position wherein the dynamic performance of the vehicle is set to drive on low-grip road surfaces in sport driving mode, a third position wherein the dynamic performance of the vehicle is set to drive on normal-grip road surfaces in sport driving mode, and a fourth position wherein the dynamic performance of the vehicle is set to drive in safe conditions in touring driving mode; the racing-start procedure only being preformed if, when the switch is pressed, the switch is in the second or third position.

12. A vehicle as claimed in claim 11, wherein the steering wheel has a recessed seat housing the switch.

13. A vehicle as claimed in claim 12, wherein a cover is provided, and is hinged to the steering wheel to close the seat of the switch.

14. A vehicle comprising
a passenger compartment having a steering wheel operated by the driver to steer the vehicle;
a central control unit which supervises operation of active components of the vehicle, and modifies the operating parameters of the active components to modify the dynamic performance of the vehicle; and
A selection device which is located inside the passenger compartment of the vehicle, and is operated by the driver to transmit a selected dynamic performance to the vehicle to the central control unit, and comprises a switch fitted to the steering wheel of the vehicle and rotatable between at least four different positions, each corresponding to a respective dynamic performance of the vehicle;
wherein the switch can be rotated into a first position wherein the dynamic performance of the vehicle is set to drive on low-grip road surfaces, a second position wherein the dynamic performance of the vehicle is set to drive on low-grip road surfaces in sport driving mode, a third position wherein the dynamic performance of the vehicle is set to drive on firm-grip road surfaces in sport driving mode, and a fourth position wherein the dynamic performance of the vehicle is set to drive in safe conditions in touring driving mode; and
wherein the switch can be set to a fifth position wherein dynamic performance of the vehicle is set to track racing mode and the switch can only be set to the fifth position from the third position by moving the switch linearly into a control position, from which the switch returns automatically into the third position; the dynamic performance of the vehicle being set according to the angular position of the switch once the engine of the vehicle is turned off.

15. A vehicle as claimed in claim 14, and comprising electronic driver-aid devices which are disabled when the switch is set to the fifth position.

16. A vehicle comprising
a passenger compartment having a steering wheel operated by the driver to steer the vehicle;
a central control unit which supervises operation of active components of the vehicle, and modifies the operating parameters of the active components to modify the dynamic performance of the vehicle; and
a selection device which is located inside the passenger compartment of the vehicle, and is operated by the driver to transmit a selected dynamic performance of the vehicle to the central control unit, and comprises a switch fitted to the steering wheel of the vehicle and rotatable between at least four different positions, each corresponding to a respective dynamic performance of the vehicle;
wherein the switch can be rotated into a first position wherein the dynamic performance of the vehicle is set to drive on low-grip road surfaces, a second position wherein the dynamic performance of the vehicle is set to drive on low-grip road surfaces in sport driving mode, a third position wherein the dynamic performance of the vehicle is set to drive on firm-grip road surfaces in sport driving mode, and a fourth position wherein the dynamic performance of the vehicle is set to drive in safe conditions in touring driving mode;
wherein, to modify the dynamic performance of the vehicle, the central control unit acts on a servocontrol of a gearbox, on an electronic control controlling the lock percentage of a self-locking differential, on an electronic control controlling suspension response, on an electronic control controlling the stability of the vehicle, and on an electronic control controlling drive and response of the engine; and
wherein, in the first position, the performance of the engine, the servocontrol of the gearbox, and the electronic control controlling the lock percentage of the self-locking differential are set for low-grip operation, while the electronic control controlling suspension response, and the electronic control controlling the stability of the vehicle are set for normal operation; in the second position, the performance of the engine, the electronic control controlling suspension response, and the electronic control controlling the lock percentage of the differential are set for normal operation, while the servocontrol of the gearbox, and the electronic control controlling the stability of the vehicle are set for sport operation; in the third position, the performance of the engine, the electronic control controlling suspension response, the electronic control controlling the lock percentage, the servocontrol of the gearbox, and the electronic control controlling the stability of the vehicle are set for sport operation; and, in the fourth position, the performance of the engine the electronic control controlling suspension response, the electronic control controlling the lock percentage, the servocontrol of the gearbox, and the electronic control controlling the stability of the vehicle are set for normal operation.

\* \* \* \* \*

UNITED STATES PATENT AND TRADEMARK OFFICE
CERTIFICATE OF CORRECTION

PATENT NO. : 7,549,649 B2  Page 1 of 1
APPLICATION NO. : 10/552042
DATED : June 23, 2009
INVENTOR(S) : Jean-Luc Baldas It is certified that error appears in the above-identified patent and that said Letters Patent is hereby corrected as shown below:

ON THE COVER PAGE, ITEM 87,

Change

"PCT Pub. No.: WO2004/087484

PCT Pub. Date Nov. 14, 2004"

To

--PCT Pub. No.: WO2004/087484

PCT Pub. Date Oct. 14, 2004--.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,549,649 B2  Page 1 of 1
APPLICATION NO. : 10/552042
DATED : June 23, 2009
INVENTOR(S) : Franck Baldet It is certified that error appears in the above-identified patent and that said Letters Patent is hereby corrected as shown below:

ON THE COVER PAGE, ITEM 87,

Change

"PCT Pub. No.:   WO2004/087484

PCT Pub. Date   Nov. 14, 2004"

To

--PCT Pub. No.:   WO2004/087484

PCT Pub. Date   Oct. 14, 2004--.

This certificate supersedes the Certificate of Correction issued August 31, 2010.

Signed and Sealed this

Fourteenth Day of December, 2010

David J. Kappos
*Director of the United States Patent and Trademark Office*